Patented Dec. 22, 1936

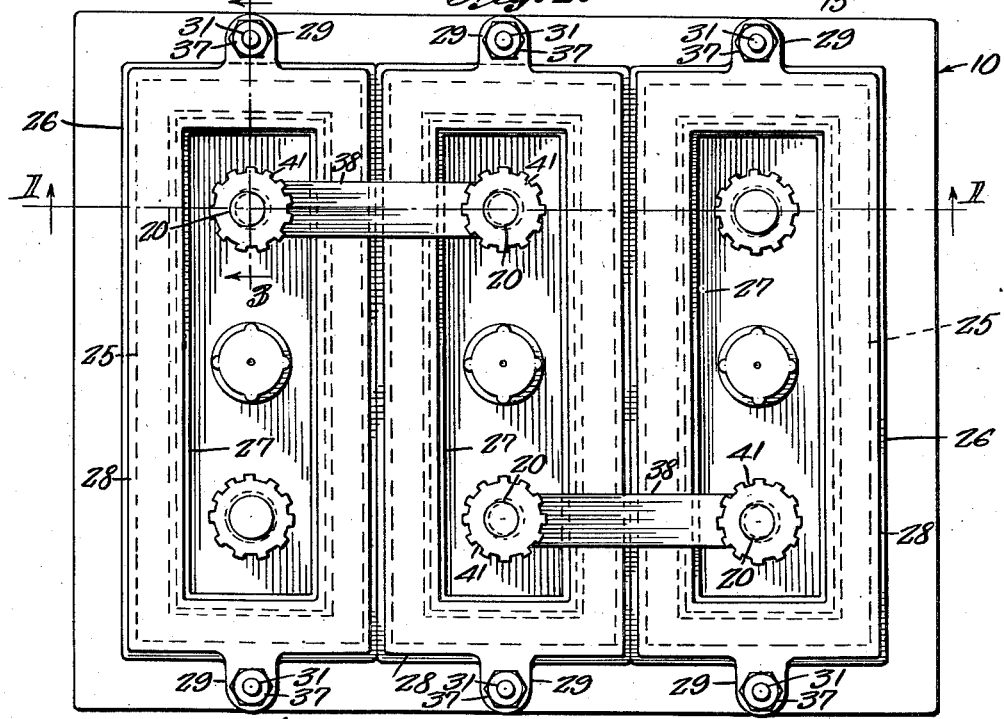

2,065,444

UNITED STATES PATENT OFFICE 2,065,444

STORAGE BATTERY

Augustine George Nelson Gallant, Wilmington, Mass.

Application October 23, 1934, Serial No. 749,600

3 Claims. (Cl. 136—170)

The invention relates to storage batteries and has for its general object the provision of a novel construction of battery whereby the individual cells may be quickly and easily removed and replaced in the event of any necessity for repairs.

It is well known that the ordinary type of storage battery consists of a plurality of individual cells mounted within a case or box and each enclosing its group of interleaved plates and separators, the assembly being completed or the parts being held together by a mass of bituminous material which constitues the top of the battery and which must be melted and laboriously removed in case it is desired to have access to the interior of the battery for the purpose of making repairs or replacements, it being moreover necessary to reapply such bituminous material to the top after any necessary repairs have been effected.

It is with the above facts in view that I have devised the present invention which has for an important object the provision of a storage battery in which the covers for the cells are held in place by compressible gaskets located in surrounding relation thereto and interposed therebetween and the walls of the cells, metallic means being also provided detachably mounted upon the top of the battery and coacting with the gaskets for holding them firmly in place and in compressing engagement with the walls or surfaces engaged thereby so that there will be no possibility of leakage of the electrolyte.

Another object of the invention is to provide a storage battery in which the cover members for the cells are equipped with gasket means cooperating with the upstanding posts of the respective groups of plates for preventing leakage, and in which there are provided connecting bars, for connecting successive cells, secured in place with respect to the posts upon which they are engaged without being "burned" thereto as is the common practice, this feature facilitating disassembly in case repairs to any cell are needed.

An additional object is to provide a storage battery of this type and possessing these advantageous characteristics and which will at the same time be simple and inexpensive to make and assemble, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical cross sectional view through a storage battery constructed in accordance with my invention, the view being taken on the line 1—1 of Figure 2, Figure 2 is a top plan view, Figure 3 is a fragmentary cross section taken at right angles to Figure 1, the view being taken on the line 3—3 of Figure 2, Figure 4 is a detail cross section through one side of one of the gaskets prior to its being placed in position.

Referring more particularly to the drawing, I have shown the battery as comprising a box or case 10 constructed, as usual, of some suitable material which is unaffected by the acid of the electrolyte. This box or case is ordinarily rectangular in shape and is divided by partitions 11 into separate compartments or cells 12 within each of which are interleaved positive and negative plates indicated at 13 and 14, respectively, spaced apart by means of the usual separators 15. As is customary, the plates of the respective groups are connected by a cross bar 16 from which rises a post which extends above the top of the battery.

In accordance with my invention this post 17 is formed intermediate its ends with an enlargement 18 from which rises a reduced stem 19 having a threaded end 20.

Located within each cell is an elongated rectangular cover member 21 which has its sides preferably spaced equal distances from the confronting walls of the cell. This cover member is represented as of inverted channel shape in cross section or in other words is open at the bottom with its lower edges extended inwardly or provided with reinforcing beads 22. As there are two upstanding posts 17 for each cell, one associated with the positive plates and the other associated with the negative plates, each cover member 21 is apertured at its top for passage of the posts and it is preferable that the material of the cover member be thickened as indicated at 23 around the openings for the sake of strength. It should be mentioned in passing that these cover members 21 are formed of hard rubber or its equivalent. While it is no particular part of my invention, each cover member is formed with the usual vent for the escape of gases within the battery. The reduced stems 19 of the post of course project considerably above the cover members. Furthermore, I provide a rubber washer 24 beneath the cover member and resting upon the enlargement 18 of the stem. Such washers are of course well known but I employ them for the purpose of preventing leakage about the stems.

Fitting about each cover member 21 is a gasket 25 formed preferably of rather stiff rubber but which is sufficiently yieldable that it may be compressingly engaged between the cover member 21 and the walls of the cell. The gasket is rectangular in shape and in fact may be said to resemble a frame and is intended to fill, completely, the space between the sides and ends of the cover 21 and the sides and ends of the cell so as to prevent any leakage of the electrolyte. The web of the gasket is initially or normally of somewhat wedge shape in cross section as shown in Figure 4 though when it is forced down into place the sides will be parallel as shown in Figure 1. At its upper edge the web of the gasket is formed with outwardly and inwardly extending flanges 26 and 27, respectively, the former lying upon the upper edge of the cell and the latter engaging upon the top of the cover member 21. The gasket is thus of rectangular-frame form, the vertical cross section of which is T-shaped.

For holding the gaskets in place I provide in association with each a rectangular frame-like metal plate 28 which is preferably of slightly less dimensions than the gasket and which is provided at each end with ears 29 overlying corresponding ears 30 on the gasket. For holding the metal plates down upon the gaskets, I provide vertically extending bolts 31 which pass through holes 32 formed through outwardly extending enlarged portions 33 at the upper portions of the walls of the box or case 10, these enlarged portions tapering down into the sides of the case as shown at 34. This proposition of enlarging the upper edges of the walls of the case is well known and is resorted to principally for strengthening the open top of the battery without increasing the thickness of the walls throughout and hence the weight. Moreover the provision of the enlargement provides more or less of a finger hold for moving the battery about from place to place. The bolts 31 have partially cut away or peculiarly shaped heads 35 located within recesses 36 at the inclined or tapered surfaces 34 as clearly shown in Figure 3 and are of course equipped with nuts 37 which, when screwed down snugly, will force the metal plates 28 down onto the gaskets 25 and prevent the latter from coming out.

The positive post of one cell must of course be connected with the negative post of the next as is customary. To accomplish this, I make use of straps or bars 38 each of which is formed at its ends with holes 39 adapted to receive the upstanding reduced stems 19 of the positive and negative posts, respectively, of adjacent cells. Bosses 40 surround these holes and bear upon the top of the cover members 21. These bars 38 are held properly in position by means of nuts 41 which are engaged upon the threaded ends 20 of the stems and which are screwed down tightly onto the top of the bars.

From the foregoing description and an inspection of the drawing it will be quite clear how the battery is constructed. In case any defect develops in any cell, it is a simple matter to make repairs or to replace worn out parts as it is merely necessary to unscrew the nuts 41 so that the bar 38 associated with the defective cell may be removed. The nuts 37 associated with the defective cell are then removed and the plate 28 lifted off, whereupon it is a simple matter to grasp the flanges 26 and 27 of the gasket 25 and pull the gasket out, after which the cover member 21 may be removed, permitting access to the interior of the cell. After any repairs have been made reassembly is effected by placing the cover member 21 in position with the stems 19 passing through the holes, after which the gasket 25 is forced into place, the plate 28 laid upon the gasket and the bolts 31 placed in position and the nuts 37 screwed down on the bolts. The bar 38 is replaced and the nuts 41 are again applied to the threaded ends 20 of the stems on the post. This is all that is necessary in order to disassemble and reassemble the parts and it is apparent that it is a simple operation not requiring any special tools and entirely avoiding the messy and troublesome practice of steaming or otherwise heating any bituminous substance such as is customarily used for sealing batteries.

From the above description it is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a storage battery comprising a case divided by partitions into separate cells, groups of interleaved positive and negative plates with interposed separators located within each cell, cross bars connecting the plates of the respective groups, an upstanding post carried by each cross bar and having an outwardly extending enlarged portion and a reduced upstanding stem, a cover member conforming in shape to the cell and of less dimensions than the cell, the cover member being formed with openings for the passage of said stems and seating upon the enlarged portion of the posts, a frame plate secured to the case, and a gasket of rectangular-frame form the vertical cross section of which is T-shaped, said gasket having flanges compressed between the frame plate, the case and the cover member, said gasket having a wedge-shaped web compressed into the space between the cover member and the confronting walls of the cell.

2. In a storage battery comprising a case divided by partitions into separate cells, groups of interleaved positive and negative plates with interposed separators located within each cell, cross bars connecting the plates of the respective groups, an upstanding post carried by each cross bar and having an outwardly extending enlarged portion and a reduced upstanding stem, a cover member conforming in shape to the cell and of less dimensions than the cell, the cover member being formed with openings for the passage of said stems and seating upon the enlarged portion of the posts, a gasket of rectangular-frame form, the vertical cross section of which is T-shaped, said gasket surrounding the cover member and having a web-wedge shaped in cross section, said web being compressed into the space between the cover member and the confronting walls of the cell, and means secured to the case and overlying the gasket for retaining the same in position.

3. In a storage battery comprising a case divided by partitions into separate cells, groups of interleaved positive and negative plates with interposed separators located within each cell, cross bars connecting the plates of the respective groups, an upstanding post carried by each cross bar and having an outwardly extending enlarged portion and a reduced upstanding stem, a cover member conforming in shape to the cell and of less dimensions than the cell, the cover member being formed with openings for the passage of said stems and seating upon the enlarged portion of the posts, a gasket of rectangular-frame form, the vertical cross section of which is T-shaped, said gasket surrounding the cover member and having a wedge-shaped web compressed into the space between the cover member and the confronting walls of the cell, said gasket having outwardly and inwardly extending flanges at its upper edge overlying the upper edge of the cell and the cover member respectively, and a metallic member bolted to the case and overlying the gasket for compressing the same in position.

AUGUSTINE GEORGE NELSON GALLANT.